United States Patent Office 3,410,718
Patented Nov. 12, 1968

3,410,718
PHENOL-FORMALDEHYDE NOVOLAK-PHENOL-FORMALDEHYDE RESOLE MOLDING SURFACE FOR A REINFORCED MATRIX BASE SHEET
Edwin S. Smith, Hampton, Conn., assignor to Rogers Corporation, Rogers, Conn., a corporation of Massachusetts
No Drawing. Filed Feb. 23, 1965, Ser. No. 434,664
1 Claim. (Cl. 117—138.8)

ABSTRACT OF THE DISCLOSURE

This specification describes an improved composition for providing a molding surface on a fiber-reinforced thermosetting resin sheet. The composition comprises a suspension of a finely divided phenol-formaldehyde novolak molding compound in an aqueous solution of a volatile organic liquid having dissolved therein a minor amount of a phenol-formaldehyde condensation product of the resole type.

---

The present invention relates to a composition for providing an improved molding surface on fiber-reinforced resin sheets to be employed as matrices for forming molded thermoplastic or rubber printing plates or similar articles.

Fiber-reinforced thermosetting resin sheets have long been employed as matrices for molding printing plates and similar articles but the sheet itself is not capable of receiving impressions which are sufficiently sharply defined to provide satisfactory printing plates. Accordingly, it has been conventional to provide the fiber-reinforced sheet with a molding surface comprising a thin layer of a finely divided phenol-formaldehyde novolak molding compound.

The molding compound is applied to the base sheet in the form of a suspension in a coating composition comprising hydroxy ethyl cellulose dissolved in an aqueous solution of a volatile solvent. This results in a considerable improvement, particularly as to the definition of the characters impressed into the molding surface, but the resulting matrix suffers from poor adherence of the molding surface to the underlying fiber-reinforced thermosetting resin sheet. There is a pronounced tendency of molding surfaces formed from such a coating to be subject to pick-off of small amounts of the molding surface during use.

Accordingly, it is the object of the present invention to provide a composition for forming a molding surface on fiber-reinforced thermosetting resin sheets, which molding surface will receive very sharply defined impressions and will tightly adhere to the base sheet after the impressions have been formed and the sheet cured.

A further object of the invention is to provide a fiber-reinforced thermosetting resin having a molding surface which upon having impressions formed therein and cured, wil be tightly adherent to the base sheet during plate molding.

Other objects of the invention will become apparent from the following detailed description thereof:

It has been found that the objects of the invention may readily be achieved by adding a phenol-formaldehyde condensation product of the resole type. If this is done, the hydroxy ethyl cellulose can be eliminated, either all or in part. Thus, the composition of the invention will comprise in its broadest aspect a finely divided phenol-formaldehyde novolak molding compound dispersed in an aqueous solution of a volatile organic liquid in which it is insoluble, or only slightly soluble, the liquid having dissolved therein a minor amount, as compared with the molding compound, of a phenol-formaldehyde condensation product of the resole type.

The volatile organic liquid employed will preferably be methyl alcohol. This material is particularly valuable because it is miscible with water and it has been found that it can be diluted with substantial amounts of water and still be capable of dissolving the required amount of resole type phenol-formaldehyde condensation product. Thus, it results in a considerable economy and also rdeuces the fire and health hazard upon the application of the composition and removal of volatile solvent after application.

The finely divided phenol-formaldehyde novolak molding compound which is employed is a conventional article of commerce. As is well known, when phenol and formaldehyde are reacted in the presence of an acidic catalyst in a mol ratio of less than 1:1 of formaldehyde to phenol, there results a permanently fusible non-curing resin known as a "novolak." In order to make this resin curable to an infusible product, there is added a basic substance, such as hexamethylenetetramine, which remains inactive until heat and pressure are applied to effect curing.

The resulting compositions are referred to as phenol-formaldehyde novolak molding compounds and they are available in finely divided form, for example, 100 mesh or greater on the United States Standard Screen Scale, which is necessary for use in the present invention. The finely divided phenol-formaldehyde novolak molding compounds of commerce will ordinarily contain a filler such as wood flour, an one such commercial product containing about 50% by weight of wood flour has been found to be quite satisfactory for use in the composition of the invention. Phenol-formaldehyde novolak molding compounds are insoluble in methyl alcohol and many other common volatile organic solvents.

For a complete disclosure of phenol-formaldehyde novolak molding compounds, reference is made to Modern Plastics Encyclopedia, 1957, page 136.

The phenol-formaldehyde condensation product in the resole stage which forms a part of the composition of the invention is also readily available commercially as the so-called "phenolic laminating varnishes." One such varnish is a 60% solids solution in methyl alcohol, which will obviously be quite satisfactory for use when this solvent is used as the suspending vehicle in the present composition.

As is well known, a resole is the first or "A" stage product which results when phenol and formaldehyde are reacted in the presence of a basic catalyst, such as sodium hydroxide, in a mol ratio of 1:1 or greater of formaldehyde to phenol. The resole stage is produced by the condensing of methylol groups, and this may be defined as a phenol alcohol. The product is low-melting and is soluble in many organic solvents, including, as has been stated, methyl alcohol. The resoles are capable of being cured by the application of heat and pressure to a final product which is infusible and insoluble in all common solvents, passing through the "B" or resitol stage, the resins of which are still fusible but are soluble only with difficulty. A complete disclosure of resoles and the mechanism by which they are converted to the final infusible state is also to be found in Modern Plastics Encyclopedia, 1957, at pages 135 and 136.

The nature of the thermosetting resin of the fiber-reinforced thermosetting resin sheet to which the composition is applied to provide a molding surface forms no part of the present invention. The thermosetting resin can be any of the conventional resins of this type which will have the required strength and rigidity and the fibers present for reinforcement may be any of the common vegetable or mineral fibers employed for this purpose. The thermosetting resin of the base sheet may, in fact, be a phenolic resin.

The relative proportions of the various ingredients of the composition of the invention are not all critical, although the phenol-formaldehyde novolak molding compound will ordinarily be present in a larger amount than the phenol-formaldehyde condensation product in the resole state. In general, it may be stated that the composition will contain from 20–50% by weight of the finely divided phenol-formaldehyde novolak molding compound, from 20–50% by weight of volatile organic liquid, from 1–25% by weight of water, from 1–30% by weight of phenol-formaldehyde condensation product of the resole type, and up to 10% of hydroxy ethyl cellulose, if present. The phenol-formaldehyde condensation product of the resole type will ordinarily be added to the composition in solution in a volatile organic solvent, such as methyl alcohol, and such solvent is included in the range given for the proportion of volatile organic solvent in the composition as a whole.

Preferred composition of the invention will be included in the following tabulation in which methyl alcohol is employed both as an aqueous solution in which the novolak molding compound is dispersed and as the solvent in which the resole type phenol-formaldehyde condensation product is dissolved:

|  | Percent |
|---|---|
| Phenolic novolak molding compound | 30–40 |
| Methyl alcohol | 30–40 |
| Water | 10–20 |
| Phenolic resole (60% in methanol) | 5–15 |
| Hydroxy ethyl cellulose | 0–2 |

The coating suspension is prepared by suspending pulverized molding compound in the aqueous solution of volatile organic liquid and then adding hydroxy ethyl cellulose if this material is to be present. The solution of phenol-formaldehyde condensation product in methyl alcohol is added after the molding compound has been completely dispersed in the vehicle, and the entire composition is vigorously stirred until the mixture is homogeneous.

The composition, formulated as above, may be applied to the base fiber-reinforced thermosetting resin sheet by spraying, brushing or other conventional coating methods, and the coated sheet is then air dried and subsequently oven dried at approximately 150° F. prior to molding, sufficient of the composition being applied to provide a mloding surface of .005 to .050 inch in thickness.

The molding of the coated sheet to give it the desired impressions is carried out under pressure at a temperature which will effect curing to the infusible state of all of the thermosetting resinous material contained in the sheet.

The following examples of coating compositions prepared in accordance with the invention are set forth as illustrative of but not as limiting the same.

Example 1

36 grams of 100 mesh fines of phenol-formaldehyde novolak molding compound with 50% by weight of wood flour filler were added with stirring to 36 grams of methyl alcohol, stirring being continued until dispersion was complete. 18 grams of water were then added with stirring and the molding compound was completely dispersed in the aqueous methanolic solution. 10 grams of a 60% solids solution of phenol-formaldehyde condensation product in the resole stage were added with vigorous stirring, this stirring being continued until a homogeneous mixture resulted.

Example 2

Example 1 was repeated except that the water added to the initial supension of molding compound in methyl alcohol had dissolved therein 0.4 gram of hydroxy ethyl cellulose.

Matrices were produced by spraying the compositions of Examples 1 and 2 on fiber-reinforced phenolic resin sheets and air drying and oven drying the coated sheets at about 150° F. It was found that after molding and curing, the formed impressions were extremely sharply defined and that after long periods of use in producing thermoplastic printing plates, the molding surfaces were still intact and tightly adherent to the base sheets.

Having thus described the invention, I claim:

1. A fiber-reinforced thermosetting resin base sheet having a molding surface which is capable of receiving very sharply defined impressions upon molding and being cured and which surface will tightly adhere to said base sheet during use, said surface comprising a mixture of a major proportion of a finely divided phenol-formaldehyde novolak molding compound and a minor proportion of a phenol-formaldehyde condensation product in the resole stage and a minor amount of hydroxy ethyl cellulose.

References Cited

UNITED STATES PATENTS

| 1,233,298 | 7/1917 | Baekeland | 260—17.2 |
| 2,806,832 | 9/1957 | Drumm et al. | |
| 2,888,418 | 5/1959 | Albanese. | |
| 2,977,273 | 3/1961 | Korican | 161—258 |
| 3,002,948 | 10/1961 | Lawther et al. | |
| 3,207,652 | 9/1965 | Shannon | 260—838 |
| 1,151,849 | 8/1915 | Aylsworth et al. | 161—258 |
| 2,218,351 | 10/1940 | Crowell | 161—400 |
| 3,326,825 | 6/1967 | Clougherty et al. | 260—14 |

FOREIGN PATENTS 1,172,278   6/1964   Germany.

WILLIAM H. SHORT, *Primary Examiner.*

E. M. WOODBERRY, *Assistant Examiner.*